No. 691,097. Patented Jan. 14, 1902.
H. BARK.
HORSE MUZZLE.
(Application filed July 5, 1901.)

(No Model.)

Witnesses:
Otto Greenberg
Samuel W. Balch

Inventor
Henry Bark,
By
Thomas Ewing, Jr.
Attorney

United States Patent Office.

HENRY BARK, OF YONKERS, NEW YORK.

HORSE-MUZZLE.

SPECIFICATION forming part of Letters Patent No. 691,097, dated January 14, 1902.

Application filed July 5, 1901. Serial No. 67,098. (No model.)

*To all whom it may concern:*

Be it known that I, HENRY BARK, a citizen of the United States of America, and a resident of Yonkers, county of Westchester, and State of New York, have invented certain new and useful Improvements in Horse-Muzzles, of which the following is a specification.

This muzzle is designed especially as a protection for horses and other animals against such contagious diseases as are communicated through the mouth. Such a disease, for example, is glanders, which is contracted by licking the mucus from the mouth of a glandered horse. This is especially liable when a horse is sent away to be shod or is fastened in stalls or at hitching-posts where strange horses have been tied, for at such times contaminated mucus may be taken directly from glandered horses or from walls or posts on which the mucus may have been deposited. It is intended that the muzzle shall be used at such times. In order that it may be a thorough protection, the muzzle consists of two baskets, one within the other. The inner one is of woven wire and the outer one serves as a fender for the inner basket. It is connected to the rim of the inner basket, and the connections between the two are such that the bodies of the two baskets are rigidly separated.

The manner in which I prefer to embody my invention is illustrated in the accompanying drawings, in which—

Figure 1:
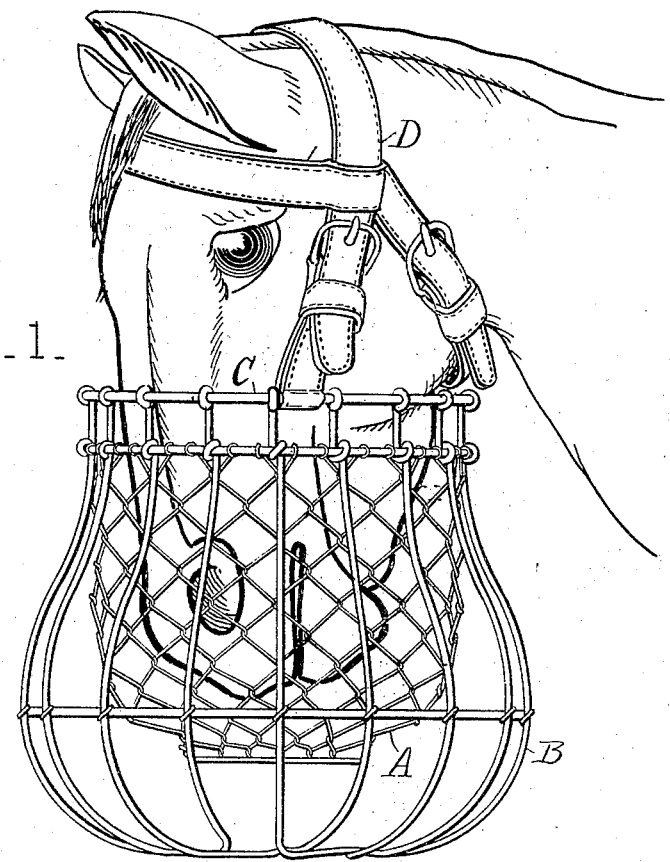
Figure 2:
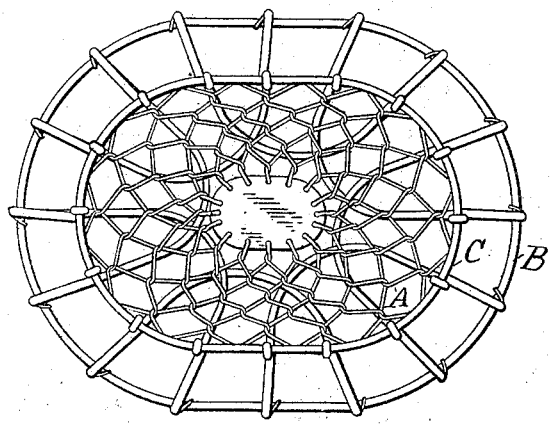

Figure 1 is a side view of the muzzle in place on a horse, and Fig. 2 is a top view.

The muzzle consists of a basket A, of woven wire, which is surrounded by another basket or fender B, also of wire. The fender is connected to the rim C of the inner basket. The mesh of the inner basket should be sufficiently fine to prevent the horse from forcing his nose through the meshes, and the mesh of the fender should be fine enough and it should be spaced sufficiently from the inner basket to prevent any object, such as the corner of a post, with which the muzzle might be brought in contact, from entering sufficiently to come within reach of the horse's tongue when it is protruding through the meshes of the inner basket.

It is not essential to the invention that the muzzle should be constructed of any particular material or that any particular form of mesh should be adopted except that the material of which the two baskets are constructed and the connections between the two baskets should be sufficiently rigid to prevent the bodies of the baskets from being forced in contact by any pressure that a horse would exert with his nose against the inner basket.

Suitable straps D are provided for attaching the muzzle to the horse's head.

What I claim as new, and desire to secure by Letters Patent of the United States, is—

1. A horse-muzzle consisting of two baskets contained one within the other, and rigid connections between the baskets by which their bodies are prevented from coming in contact, substantially as described.

2. A horse-muzzle consisting of two baskets contained one within the other, and rigid connections between the baskets at their rims by which their bodies are prevented from coming in contact, substantially as described.

3. A horse-muzzle consisting of a woven-wire basket and a surrounding rigid fender which is connected to the rim and separated from the body of the basket, substantially as described.

Signed by me this 27th day of June, 1901, at Yonkers, New York.

HENRY BARK.

Witnesses:
GEORGE K. HENDRICKSON,
CHAS. H. BIDDINGER.